(12) United States Patent
Geller et al.

(10) Patent No.: US 7,333,968 B2
(45) Date of Patent: Feb. 19, 2008

(54) CONDITIONAL CSP SOLVING USING CONSTRAINT PROPAGATION

(75) Inventors: Felix Geller, Haifa (IL); Mati Joshua, Jerusalem (IL); Michael Veksler, Zichron Ya'akov (IL)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 11/205,527

(22) Filed: Aug. 17, 2005

(65) Prior Publication Data
US 2007/0100781 A1    May 3, 2007

(51) Int. Cl.
*G06F 17/00* (2006.01)
*G06N 5/02* (2006.01)

(52) U.S. Cl. ........................................ 706/46

(58) Field of Classification Search .............. 706/19, 706/46
See application file for complete search history.

(56) References Cited

U.S. PATENT DOCUMENTS

| | | | | |
|---|---|---|---|---|
| 4,858,147 | A * | 8/1989 | Conwell | 706/19 |
| 5,050,096 | A * | 9/1991 | Seidman | 706/19 |
| 5,263,121 | A * | 11/1993 | Melsa et al. | 706/19 |
| 5,671,338 | A * | 9/1997 | Araki et al. | 706/46 |
| 5,761,381 | A * | 6/1998 | Arci et al. | 706/13 |
| 5,799,295 | A * | 8/1998 | Nagai | 706/46 |
| 6,336,110 | B1 * | 1/2002 | Tamura et al. | 706/46 |
| 6,556,978 | B1 * | 4/2003 | Ginsberg et al. | 706/19 |
| 6,735,622 | B1 * | 5/2004 | Andreoli et al. | 709/219 |
| 6,912,515 | B2 * | 6/2005 | Jackson et al. | 706/19 |
| 7,020,670 | B1 * | 3/2006 | Andreoli et al. | 715/516 |
| 7,085,748 | B2 * | 8/2006 | Emek et al. | 716/14 |
| 7,089,220 | B2 * | 8/2006 | Fromherz et al. | 706/45 |
| 7,089,221 | B2 * | 8/2006 | Fromherz et al. | 706/46 |
| 7,171,393 | B2 * | 1/2007 | Naveh | 706/19 |
| 2002/0169587 | A1 | 11/2002 | Emek et al. | |

OTHER PUBLICATIONS

Conditional constraint networks for interleaved planning and information gathering Ambite, J.L.; Knoblock, C.A.; Muslea, M.; Minton, S.; Intelligent Systems, IEEE [see also IEEE Intelligent Systems and Their Applications] vol. 20, Issue 2, Mar.-Apr. 2005 pp. 25-33 Digital Object Identifier 10.1109/MIS.2005.24.*
Bin et al., Using a Constraint Satisfaction Formulation and Solution Techniques for Random Test Program Generation, *IBM Systems Journal* 41:3 (2002), pp. 386-402.
Adir et al., Piparazzi: A Test Program Generator for Micro-architecture Flow Verification, *Eighth IEEE International High-Level Design Validation and Test Workshop* (Nov. 12-14, 2003), pp. 2328.
Mackworth, Consistency in Networks of Relations, published in *Artificial Intelligence* 8, pp. 99-118 (1977).
Mittal et al., Dynamic Constraint Satisfaction Problems, *Proceedings of the Eighth National Conference on Artificial Intelligence (AAAI-90)* (Boston, Massachusetts, Jul. 1990), pp. 25-32.

\* cited by examiner

*Primary Examiner*—Michael B. Holmes

(57) ABSTRACT

A computer-implemented method for modeling a target system includes defining a conditional constraint satisfaction problem (CondCSP) that characterizes the target system in terms of problem variables and constraints applicable to the problem variables. The constraints include conditional constraints, such that the variables associated with the conditional constraints each have a respective activity status. Existence variables are defined to represent the respective activity status of the variables associated with each of the one or more conditional constraints. A solution to the CondCSP is found by determining an assignment of the problem variables and the existence variables that satisfies the constraints.

16 Claims, 4 Drawing Sheets

CONDITIONAL CSP SOLVING USING CONSTRAINT PROPAGATION

FIELD OF THE INVENTION

The present invention relates generally to solving constraint satisfaction problems (CSPs), and specifically to methods and systems for solving conditional CSPs.

BACKGROUND OF THE INVENTION

Many of the tasks that are addressed by decision-making systems and artificial intelligence can be represented as constraint satisfaction problems (CSPs). In this representation, the task is specified in terms of a set of variables, each of which can assume values in a given domain, and a set of constraints that the variables must simultaneously satisfy. The set of variables, domains and constraints is referred to as a CSP. Each constraint may be expressed as a relation, defined over some subset of the variables, denoting valid combinations of their values. A solution to a CSP is an assignment of a value to all the variables from their respective domains that satisfies all of the constraints.

Constraint satisfaction methods have been found useful in a variety of applications, including:
Artificial intelligence
Robotic control
Temporal reasoning
Natural language processing
Spatial reasoning
Test-case generation for software and hardware systems
Machine vision
Medical diagnosis
Resource allocation
Crew scheduling
Time tabling
Frequency allocation
Graph coloring.

For example, Bin et al. describe a constraint satisfaction method for use in automated generation of test programs, in a paper entitled "Using a Constraint Satisfaction Formulation and Solution Techniques for Random Test Program Generation," *IBM Systems Journal* 41:3 (2002), pages 386-402. The authors show how random test program generation can be modeled as a CSP, and they describe a set of solution techniques that are used in practical test-case generation tools. Adir et al. describe a test generator that uses a dedicated CSP solver in a paper entitled "Piparazzi: A Test Program Generator for Micro-architecture Flow Verification," *Eighth IEEE International High-Level Design Validation and Test Workshop* (Nov. 12-14, 2003), pages 23-28. The test generator converts user requests for micro-architectural events into test programs. Further aspects of the use of CSP solving in automatic test-case generation are described in U.S. Patent Application Publication 2002/0169587 A1.

The network of constraints in a CSP can be viewed as a hypergraph, having a node for each variable and a hyper-edge for each constraint. These hyper-edges are referred to as arcs, wherein the members of such an arc are the variables that appear in the constraint to which the arc corresponds. An arc is said to be consistent if for any variable of the arc, and any value in the domain of the variable, there is a valid assignment of values to the other variables on the arc that satisfies the constraint represented by the arc. If every arc in the hypergraph is consistent, then the network is said to be arc-consistent.

One family of solution for CSPs are algorithms based on maintaining arc consistency. These algorithms were introduced by Mackworth in an article entitled "Consistency in Networks of Relations," published in *Artificial Intelligence* 8, pages 99-118 (1977). Arc consistency algorithms are based on the observation that given variables $v_1$, and $v_2$, with discrete domains $D_1$ and $D_2$, if $x \in D_1$, and there is no $y \in D_2$ that satisfies a given constraint $P_{ij}$ imposed on $v_1$, and $v_2$, then x can be deleted from $D_1$. This basic action of arc consistency algorithms is embodied in the Boolean procedure "REVISE," as defined by Mackworth in the above-mentioned paper. The arcs of the CSP network are maintained in a queue (Q), and REVISE is applied to the arcs in the queue until a solution is found.

The concept of a CSP was generalized by Mittal et al. to cover more complex problems, in which variables may be active or inactive, in a paper entitled "Dynamic Constraint Satisfaction Problems," *Proceedings of the Eighth National Conference on Artificial Intelligence (AAAI-90)* (Boston, Mass., July 1990), pages 25-32. This generalization is commonly referred to as "Conditional CSP," or CondCSP. A CondCSP comprises the following:
  A set of variables $V = \{v_1, v_2, \ldots, v_n\}$.
  A set of domains $D = \{D_1, D_2, \ldots, D_n\}$, such that $D_i$ is the set of valid values for the variable $v_i$.
  A set of initial variables $V_I \subseteq V$, $V_I \neq \phi$.
  A set of compatibility constraints $C_{comp}$.
  A set of activity constraints $C_{act}$.

In contrast to the traditional definition of CSP, a variable in a CondCSP can be either active or inactive. A variable is assigned a value only if it is active. A compatibility constraint specifies the set of allowed combinations of values for a set of variables. A compatibility constraint is active only if all its variables are active. An activity constraint has the form $$c \xrightarrow{act} v,$$

in which C is defined in the same manner as a compatibility constraint, and v is a variable. Such an activity constraint states that if the left hand constraint C holds, then the variable v is active. Activity constraints may also take the form $$c \xrightarrow{rn} v$$

(wherein rn stands for "require not"), which states that the variable v is not active if constraint C holds. A solution to a CondCSP contains (a) a set of active variables and (b) a value assignment to all the active variables, in which each variable is assigned a value from its domain, the assignment satisfying all the active compatibility constraints. The assignment and the set of active variables must satisfy all the activity constraints. A solution is considered to be minimal if no proper subset of the assignment is itself a solution.

Sabin et al. suggested a method for applying arc-consistency techniques to CondCSPs, in "Greater Efficiency for Conditional Constraint Satisfaction," *Ninth International Conference on Principles and Practice of Constraint Programming (CP 2003)* (Kinsale, County Cork, Ireland, 2003). For this purpose, the CondCSP is reformulated as a standard CSP, by adding null values to the variable domains and transforming CondCSP constraints into CSP constraints.

Another technique for reducing a CondCSP to a conventional CSP is described by Gelle et al. in "Solving Mixed and Conditional Constraint Satisfaction Problems," *Constraints Journal* 8:2 (2003), pages 107-141.

SUMMARY OF THE INVENTION

In one aspect of the present invention, a computer-implemented method for modeling a target system includes defining a conditional constraint satisfaction problem (CondCSP) that characterizes the target system in terms of problem variables and constraints applicable to the problem variables. The constraints include conditional constraints, such that the variables associated with the conditional constraints each have a respective activity status. Existence variables are defined to represent the respective activity status of the variables associated with each of the one or more conditional constraints. A solution to the CondCSP is found by determining an assignment of the problem variables and the existence variables that satisfies the constraints.

In another aspect of the present invention, shadow variables are defined, corresponding to the problem variables and representing the domains of the problem variables subject to the respective activity status of the variables associated with the conditional constraints. A CSP is solved over the shadow variables in order to find an assignment of the problem variables that satisfies the constraints.

Embodiments of the present invention also provide apparatus and computer software products implementing the above methods.

The present invention will be more fully understood from the following detailed description of the embodiments thereof, taken together with the drawings in which:

DETAILED DESCRIPTION OF EMBODIMENTS

Overview

Embodiments of the present invention that are described hereinbelow provide improved methods and systems for solving CondCSPs. These methods introduce the notion of the "shadow" of a CondCSP variable, which represents a state of the domain of the variable that would exist assuming the activity status of the variable to be TRUE. Using such shadows, multiple CSP instances are implicitly created, each based on a different set of assumptions regarding the activity status of the variables (so that each instance is a non-conditional CSP). These instances are conjoined to define an extended constraint network, which may then be solved using arc-consistency techniques, for example. In solving the extended constraint network, variable domain updates are propagated among the different CSP instances, so that the multiple instances are explored in parallel. As a result, the variable domains are pruned more rapidly, and CondCSP solutions are found more efficiently than by methods known in the art.

In some embodiments, the activity status of any given CSP instance is modeled explicitly as a Boolean "existence variable." The existence variables are used, along with the problem variables, in defining existence constraints over the activity status of the variables (and thus may be used in defining the shadow variables mentioned above). The existence constraints are solved along with the constraints of the original problem in order to infer activity status of the variables while finding the solution values of the active variables. The solution is minimal if no solution can be obtained by changing the value of some existence variable from TRUE to FALSE (and accordingly shrinking the set of assigned variables).

The embodiments described hereinbelow refer, by way of example, to the application of CondCSP solving in modeling the design of a target system, such as an electronic processor circuit, for purposes of automatic test generation. Alternatively, the methods described hereinbelow may be applied in modeling target systems of other types, and in substantially any other application of CSP solving in which conditional CSP formulations can be used, such as configuration, planning and at least some of the other application areas listed above in the Background of the Invention.

Figure 1:
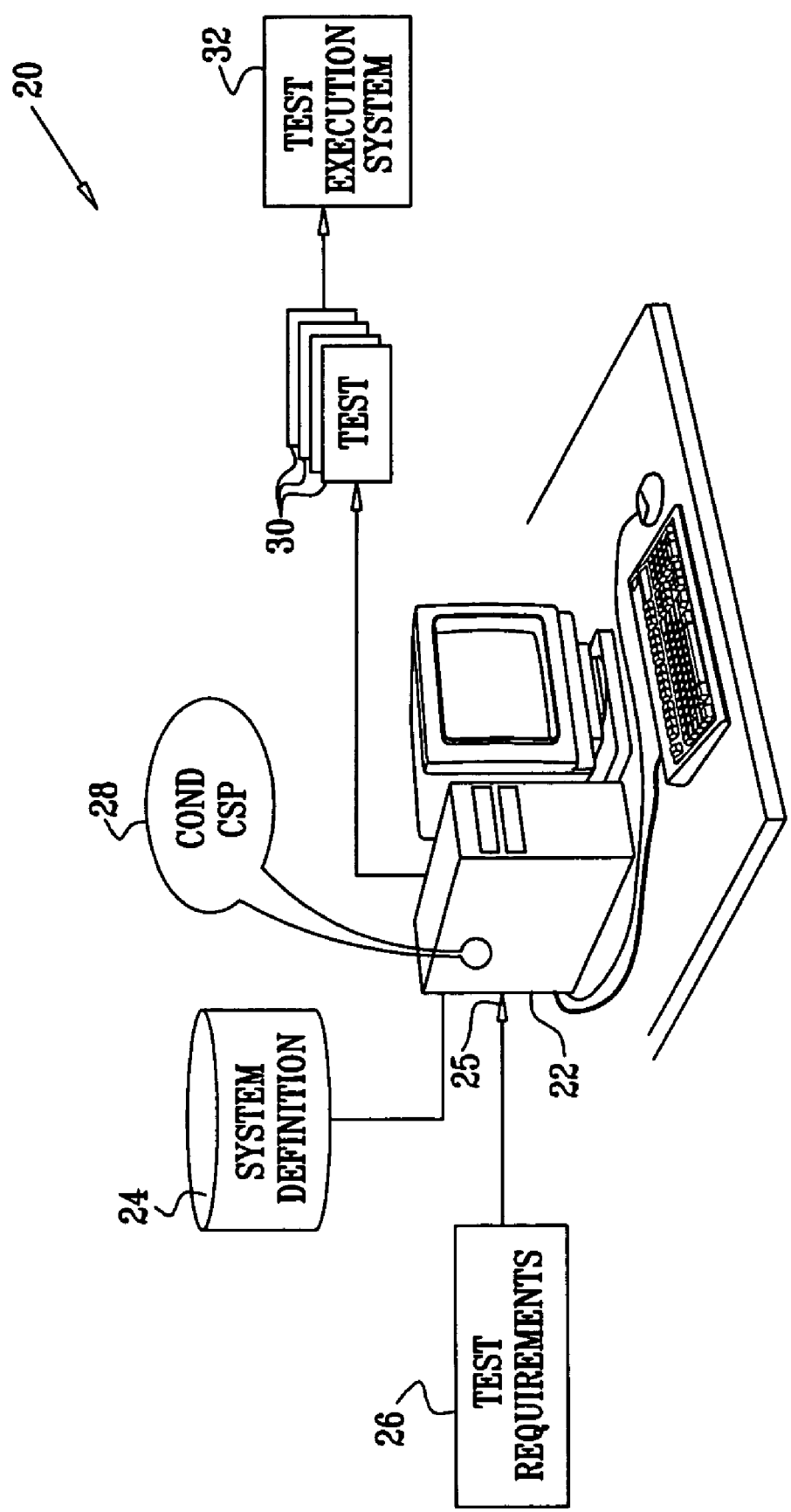
FIG. 1 is a schematic, pictorial illustration of a system for automatic test generation based on CondCSP solving, in accordance with an embodiment of the present invention.

FIG. 1 is a block diagram that schematically illustrates a system 20 for automatic test-case generation, in accordance with a preferred embodiment of the present invention. System 20 is built around a test generator 22, which receives a definition 24 of a target system and a specific set of test requirements 26 to be applied to the target system, via an input interface 25. Definition 24 is typically expressed in terms of a set of variables and constraints to be applied to those variables. Test requirements 26 typically comprise additional constraints, such as domain limitations, to be applied by generator 22 in producing test cases 30. The test requirements may be input in various forms, for example, in the form of a user-generated test template. Input interface 25 may thus comprise, for example, a user interface or a communication interface for receiving input information from another computer, or a combination of these elements. The constraints included in definition 24 and/or test requirements 26 typically include compatibility constraints and activity constraints on the variables, as defined hereinabove.

Test generator 22 frames the variables and constraints in the form of a CondCSP. The test generator comprises a CondCSP solver 28, which finds test cases 30 by solving this CondCSP. In other words, each test case found by generator 22 is a (random) concrete solution to the CondCSP, giving values of the variables that satisfy all of the constraints. For this purpose, the CondCSP solver defines a constraint network using existence variables and shadows to represent multiple CSP instances, and then applies an arc-consistency method to solve this constraint network, as described in detail hereinbelow.

In one embodiment of the present invention, for example, the variables provided by system definition 24 comprise possible inputs to a hardware device or software program under development. These inputs are typically instructions, addresses and possibly other properties that would be input to the device or program in the course of actual operation. Generator 22 uses test requirements 26 provided by the operator, together with constraints that it computes automatically itself, to determine test cases 30 in the form of combinations of instructions and addresses to use as test inputs to the device. These inputs may then be applied to the device or program itself, or (as shown in FIG. 1) to a test execution system 32, such as a simulator for pre-production verification of the design of the device or program.

Typically, generator 22 comprises a general-purpose or dedicated computer, programmed with suitable software for carrying out the functions described herein. The software may be supplied to the computer in electronic form, over a network or communication link, for example, or it may be provided on tangible media, such as CD-ROM or DVD. Further aspects of automatic test generation using CSP solutions are described in U.S. patent application Ser. Nos. 11/092,000 and 11/040,241, which are assigned to the assignee of the present patent application and whose disclosures are incorporated herein by reference.

CONDITIONAL CSP FORMALISM

CondCSP solver 28 defines a CondCSP as a type of composite CSP, P, which comprises variables Vars(P) and Constraints(P). The composite CSP P can be defined recursively in terms of CSP sub-problems $P_i$. The lowest-level sub-problem is an atomic problem, defined by a triple ⟨V, D, C⟩, wherein V, D and C, respectively, are the variables, variable domains, and constraints of the atomic problem. Each composite sub-problem (as well as the top-level composite problem), is defined in terms of the variables, domains, and constraints ⟨V, D, C⟩ that the sub-problem adds to its subsidiary sub-problems. Thus, for a composite problem or sub-problem P:

$$Vars(P) = V \bigcup_{i=1}^{k} Vars(P_i)$$

$$Constraints(P) = C \bigcup_{i=1}^{k} Constraints(P_i)$$

The composite CSP can thus be written as $P=(\langle V, D, C \rangle, \{P_1, P_2, \ldots, P_k\})$ The constraints in C for the composite problem may extend over any of the variables in Vars(P), i.e., they may refer to the variables in the sub-problems.

In an embodiment of the present invention, a CondCSP is defined as a composite CSP in which a Boolean existence variable $e_i \in V$ is attached to each sub-problem $P_i$. The existence of $P_i$ in a given solution of P depends on the value of $e_i$. In other words, the value of $e_i$ indicates the activity status of the variables in $P_i$. In this situation, $e_i$ is said to "dominate" the variables in Vars($P_i$). In solving the CondCSP, the existence variables are treated in the same manner as the regular problem variables, i.e., the variables that characterize the target system modeled by the CSP.

Although CondCSPs are not conventionally expressed in the hierarchical form described above, in practice substantially any CondCSP can be formulated in this manner. Given a CondCSP $P=\langle V_I, V_I \subseteq V, D, C=C_{comp} \cup C_{act}\rangle$, an equivalent composite problem $P'=(\langle V_{P'}, D_{P'}, C_{P'}\rangle, \{P_1, P_2, \ldots, P_k\})$ is constructed as follows: For each variable v not in $V_I$, a sub-problem $P_v$ is created containing the single variable v (and no constraints), with the corresponding existence variable $e_v$. $V_{P'}$ is the union of $V_I$ with the set of the existence variables. Each $$c \xrightarrow{act} v$$

constraint is converted into $C \rightarrow e_v$, while constraints of the type $$c \xrightarrow{rn} v$$

are converted into $C \rightarrow not(e_v)$. The set of constraints $C_{P'}$ is then the union of the original compatibility constraints $C_{comp}$ with the converted activity constraints.

Figure 2:
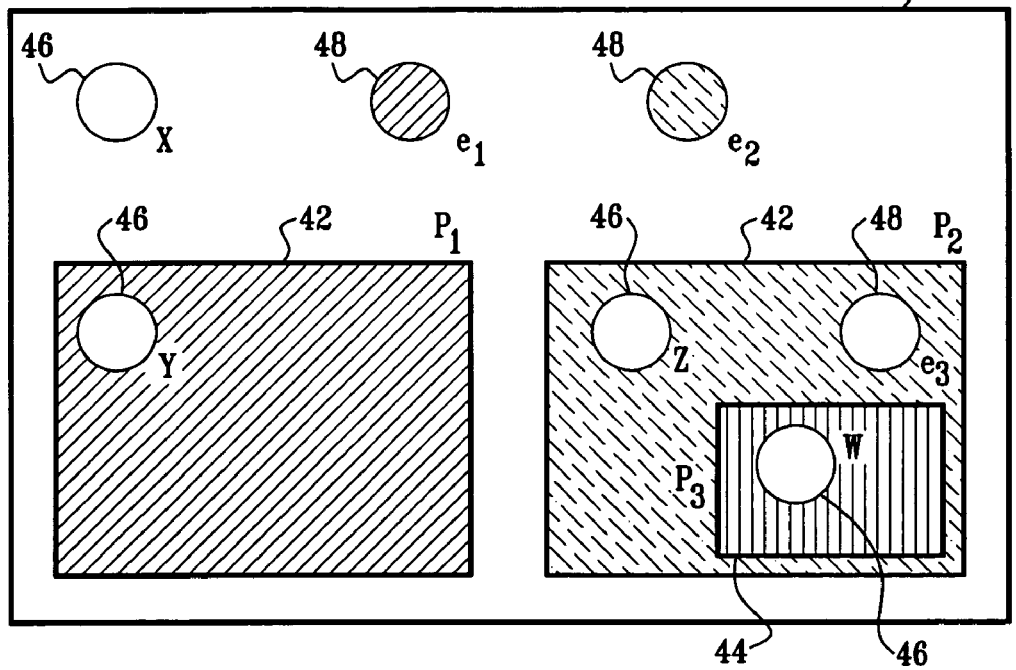
FIG. 2 is a block diagram that schematically illustrates a simplified CondCSP, in accordance with an embodiment of the present invention.

FIG. 2 is a block diagram that schematically illustrates an exemplary CondCSP, which is constructed in accordance with an embodiment of the present invention. The CondCSP comprises a top-level problem 40, referred to as P, which contains sub-problems 42 ($P_1$ and $P_2$), which in turn contains another sub-problem 44 ($P_3$). The problem and sub-problems contain respective problem variables 46 (X, Y, Z and W). An existence variable 48 ($e_1$, $e_2$, $e_3$) is respectively associated with each of the sub-problems. Each of the problem variables has a respective domain, while the domains of the existence variables are {TRUE,FALSE}. The top-level problem and each of the sub-problems typically includes constraints over the problem variables and existence variables that it contains. For example, the top-level problem P might have the set of constraints:

Constraints(P)={X=Y, X=Z, Y>3 ∨$e_3$∨ not($e_1$)}

For a sub-problem $P_j$, the set of all the existence variables that influence $P_j$ is referred to as the "existence set" of $P_j$, denoted ES($P_j$). The existence set of the top-level problem is empty, while the existence set of a sub-problem contains all the existence variables that dominate the sub-problem and its parent sub-problems. The existence set of a variable is the existence set of the sub-problem in which the variable is defined. Thus, in the example of FIG. 2, ES(W)=ES($P_3$)= {$e_2$,$e_3$}. A variable v is said to exist in a given solution if the assignments of the existence variables in the solution satisfy: ∀e ∈ES(v): e=TRUE. The existence set of a constraint is the set of all the existence variables that dominate the variables to which the constraint applies:

$$ES(C) = \bigcup_{v \in Vars(C)} ES(v).$$

Given a CondCSP P in the formalism defined above, a solution to P is an assignment of values to the variables in $V_{sol} \subseteq Vars(P)$ that satisfies the conditions:

1) All variables that exist in the solution receive assignments, i.e., $\wedge_{e \in ES(v)} e \rightarrow v \in V_{sol}$. Note that the variables in V of the top-level problem P must be in $V_{sol}$.

2) All relevant constraints in Constraints(P) are satisfied, i.e., $\wedge_{e \in ES(C)} e \rightarrow C$ is satisfied by $V_{sol}$.

The CSP thus defined over the problem variables and existence variables may be solved using an arc-consistency approach. In the embodiments of the present invention that are described hereinbelow, the method for constraint propagation in solving the CSP is extended to take advantage of the special character of the existence variables and the information they embody.

METHOD OF CONDCSP SOLUTION

Figure 3:
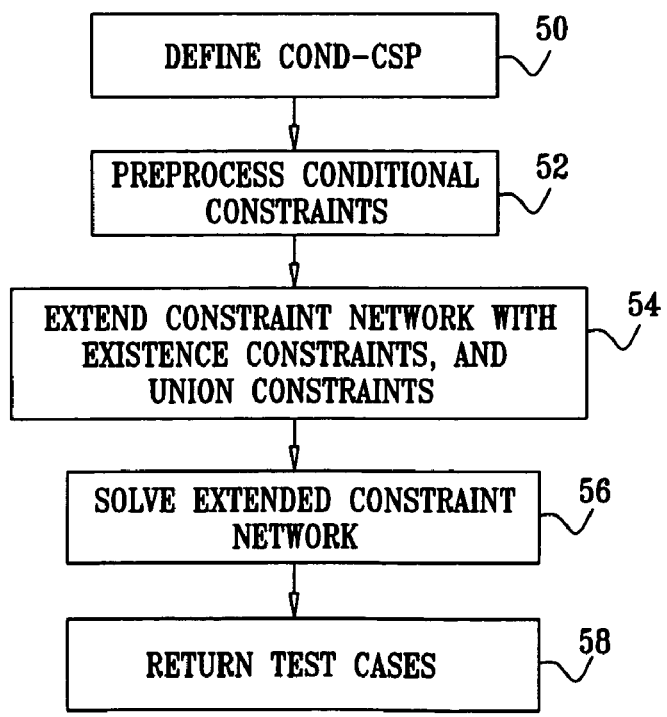
FIG. 3 is a flow chart that schematically illustrates a method for test generation based on CondCSP solving, in accordance with an embodiment of the present invention.

FIG. 3 is a flow chart that schematically illustrates a method for test generation based on CondCSP solving, in accordance with an embodiment of the present invention. Test generator 22 defines a CondCSP based on system definition 24 and test requirements 26, at a CSP definition step 50. The CondCSP is defined in terms of a hierarchy of sub-problems, each with its respective set of variables and constraints, as explained above.

CondCSP solver 28 preprocesses the CondCSP, at a preprocessing step 52. Details of this step are described hereinbelow with reference to FIG. 4. Briefly, at this step, the existence sets of the variables and conditional constraints are computed. In arc-consistency computations, a conditional constraint C is allowed to modify the domains of the variables that it affects only if the variables in ES(C) are all TRUE. Therefore, a shadow variable v[ES(C)] is defined for each variable v in Vars(C), representing the domain state of the variable that would exist if all the variables in ES(C) were TRUE. The shadow variables replace the corresponding original variables in solving the CondCSP, as described hereinbelow. Specifically, in propagation of conditional constraint C, the constraint may operate freely on its shadow variables v[ES(C)] without necessarily establishing first that ES(C) is TRUE.

A variable may have multiple shadows, depending on the constraints that are incident on the variable. For efficient constraint propagation during solution of the CondCSP, changes in the domain of any one of the shadows of v may be synchronized with the domains of the other shadows, depending on the relationships between the existence sets of the shadow variables. For this purpose, during preprocessing step 52, the CondCSP solver computes constraints on the existence variables. These additional constraints are referred to herein as "existence constraints" and "union constraints," and their computation is described in greater detail hereinbelow.

The existence constraints and union constraints are joined together with the original problem constraints to create an extended constraint network, at a network extension step 54. The nodes of the constraint network comprise the original variables and shadow variables. The CondCSP solver then solves the extended constraint network by examining trial assignments of the shadow variables while pruning the variable domains to maintain arc-consistency, at a solution step 56. Details of this step are described hereinbelow with reference to FIG. 5. A solution is found when all the variables have either been assigned values or are determined to be inactive for the given assignment of the existence variables. Test generator 22 returns this solution, indicating the values of parameters to use in a test case, at an output step 58. Typically, the test generator returns a number of test cases, corresponding to different, random solutions to the CondCSP.

Figure 4:
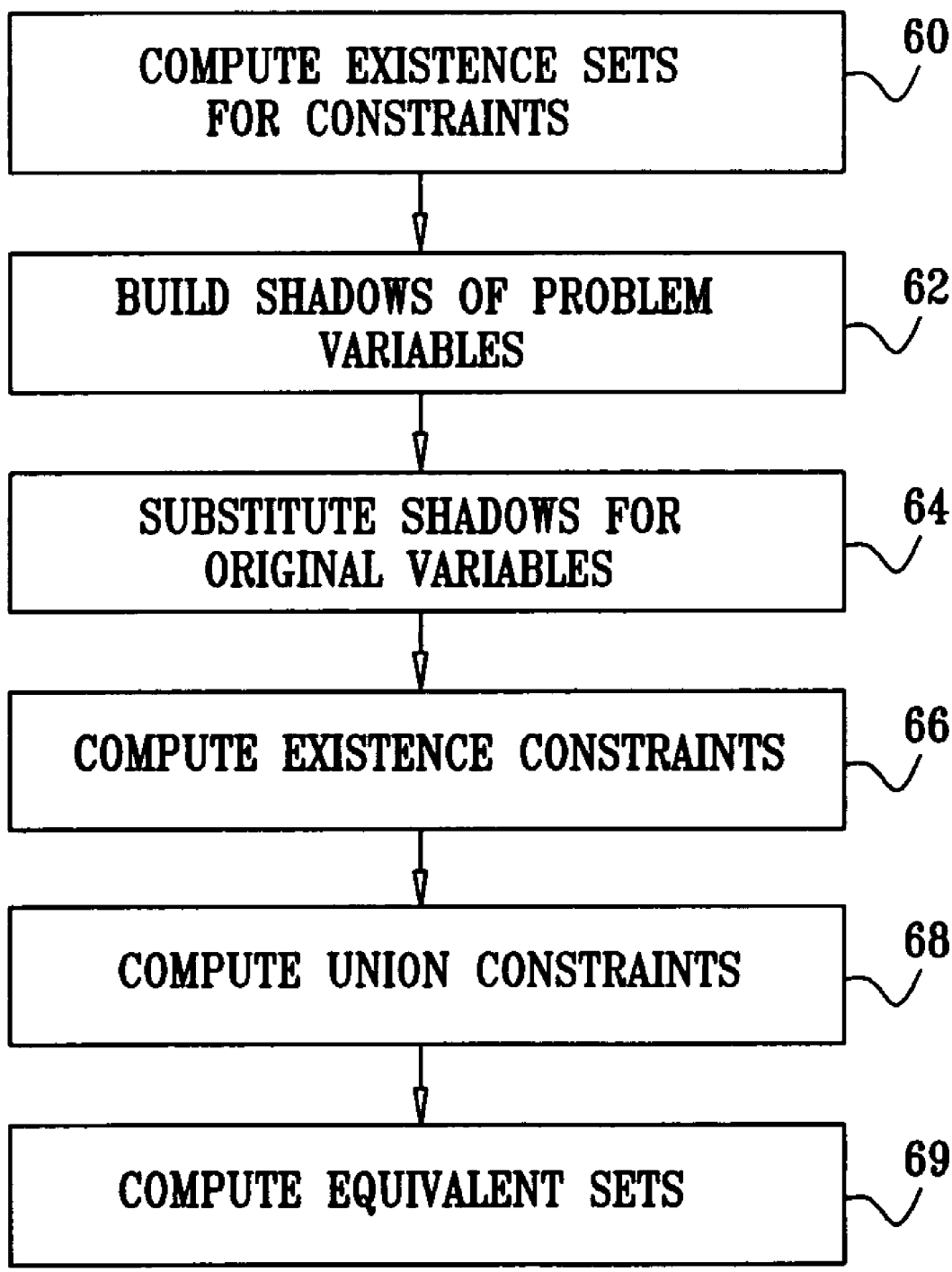
FIG. 4 is a flow chart that schematically illustrates a method for preprocessing conditional constraints, in accordance with an embodiment of the present invention.

FIG. 4 is a flow chart that schematically shows details of preprocessing step 52, in accordance with an embodiment of the present invention. This step begins with computation of the existence sets of the constraints in the CondCSP, at an existence computation step 60. As noted above, the existence set of a given constraint C is the union of the existence sets of all the variables in Vars(C). The shadows of the problem variables are then created, at a shadow building step 62. Listings I and II in the Appendix give further details of steps 60 and 62 in pseudocode form.

Each variable in the original CondCSP is replaced by its shadow variables, at a shadow substitution step 64. Details of this step are shown in Listing III in the Appendix. As noted above, the shadows are parameterized by the existence sets of the corresponding constraints. Initially, the domains of the shadow variables are equal to the domain of the original variable from which they derive. These domains are then reduced during the solution stage (step 56), as described hereinbelow.

Referring to the CondCSP in FIG. 2 above, by way of example, a constraint $C=(Z>W)$ has the existence set $\{e_2, e_3\}$. C thus creates shadow variables $Z[(e_2,e_3)]$ and $W[(e_2, e_3)]$, which take the place of the original Z and W. Since $ES(W)=\{e_2,e_3\}$, $W[(e_2,e_3)]$ is identical to W. (This identity is not true for Z.) As another example, $C=Y>3 \vee e_3 \vee$ not $(e_1)$ has the existence set $\{e_1,e_2\}$. Therefore, Y, $e_1$ and $e_2$ are replaced by the corresponding shadow variables over $\{e_1, e_2\}$. Since the existence set of the shadow variable $e_1[\{e_1, e_2\}]$ includes the variable itself, the domain of the shadow variable may be replaced by the singleton TRUE.

Solution of the CondCSP can be made more efficient by taking into account relations between the existence sets of different constraints. These relations are expressed by computing existence constraints, at an existence constraint creation step 66. Specifically, for an existence set of size two or greater, a new existence variable $e_{ES}$ is defined such that $\wedge_{e \in ES} e = e_{ES}$. For any two existence sets $ES_1$ and $ES_2$, such that $ES_1 \subseteq ES_2$, a redundant existence constraint $e_{ES_2} \rightarrow e_{ES_1}$ is added to the problem. This property of the existence constraints is useful in the solution stage in permitting the existence set of a subsidiary problem to be immediately set to FALSE when it has been determined that $e_{ES}$ is FALSE for the problem that dominates this subsidiary problem. Details of step 66 are shown in Listing IV in the Appendix.

In many applications, it is common to encounter constraints over the existence variables of the following forms:

Existence Or: $e_1 \vee e_2 \vee \ldots \vee e_k$

Existence Imply: $e_1 \rightarrow e_2$

These constraints may be used in reducing the domains of the problem variables to which the existence variables apply. For example, for a variable X with shadow variables $X[\{e_1\}]$ and $X[\{e_2\}]$, an Existence Or constraint of the form $e_1 \vee e_2$ means that in the solution of the CondCSP, either $X=X[\{e_1\}]$ or $X=X[\{e_2\}]$. Therefore, the domain of X in the solution can include no elements outside Domain($X[\{e_1\}]$)∪Domain($X[\{e_2\}]$).

This feature of the CondCSP formulation is used in computing union constraints, at a union constraint creation step 68. A union constraint over $(x_0, x_1, \ldots, x_k)$ is defined formally as $(x_0=x_1) \vee (x_0=x_2) \vee \ldots \vee (x_0=x_k)$. During solution of the CondCSP, the union constraint is projected by the operation:

$$\text{Domain}(x_0) \leftarrow \text{Domain}(x_0) \cap \bigcup_{i=1}^{k} \text{Domain}(x_i)$$

In the case of Existence Or constraints, as defined above, if a variable v has shadows $v[ES_1], v[ES_2], \ldots, v[ES_k]$, and each $e_i$ in the Existence Or constraint belongs to only one of the k existence sets (i.e., $e_i \in ES_i$ and $e_j \in ES_j$ for all i and j), then the following union constraint is added to the constraint network:

UnionConstraint(v[ES$_0$'], v[ES$_1$'], ... v[ES$_k$']).

In this expression, $ES_0$' is the intersection of all the $ES_i$, and the modified existence sets are defined as $ES_i' = ES_0' \cup \{e_i\}$ (wherein $ES_i$' may or may not be equal to $ES_i$). New shadow variables v[$ES_i$'] are created if they have not already been defined. Details of step 68 are shown in Listing V in the Appendix.

Existence Imply constraints are used in computing equivalence relations among existence sets, at an equivalence computation step 69. For example, given existence sets $ES_1$ and $ES_2$, such that $e_1 \in ES_1$, and $ES_2 = ES_1 \cup \{e_2\}$, the Existence Imply constraint $e_1 \rightarrow e_2$ means that $$\left( \bigwedge_{e \in ES_1} e \right) \leftrightarrow \left( \bigwedge_{e \in ES_2} e \right).$$

Under these conditions, $ES_1$ and $ES_2$ are said to be equivalent, and the shadow variables v[$ES_1$] and v[$ES_2$] are identical. For a given existence set ES, the maximal equivalent set $ES_{max}$ is defined as the largest set of existence variables that is equivalent to ES, such that any proper superset of $ES_{max}$ is not equivalent to ES. On the other hand, a minimal equivalent set $ES_{min}$ is defined as an equivalent set of ES such that any proper subset of $ES_{min}$ is not equivalent to ES. Procedures for computing the maximal and minimal equivalent sets of an existence set are presented in pseudocode form in Listings VI and VII in the Appendix.

In solving the CondCSP, it is convenient to work with minimal equivalent sets for the sake of computational efficiency. A given existence set may have more than one minimal equivalent set, however, and replacing the existence set with one of the minimal equivalent sets may result in failure to detect shadow equivalence. Therefore, at step 69, the CondCSP solver determines the canonical equivalent set for each existence set that was previously computed. These equivalent sets are then used as the existence sets of the conditional constraints and shadow variables in solving the constraint network at step 56. The canonical equivalent set is defined as the lexicographically smallest minimal equivalent set of the maximal equivalent set. In terms of the routines in Listings VI and VII, the canonical equivalent set is given by ComputeFirstMinimalEquivalentSet(ComputeMaximalEquivalent Set(ES)).

Figure 5:
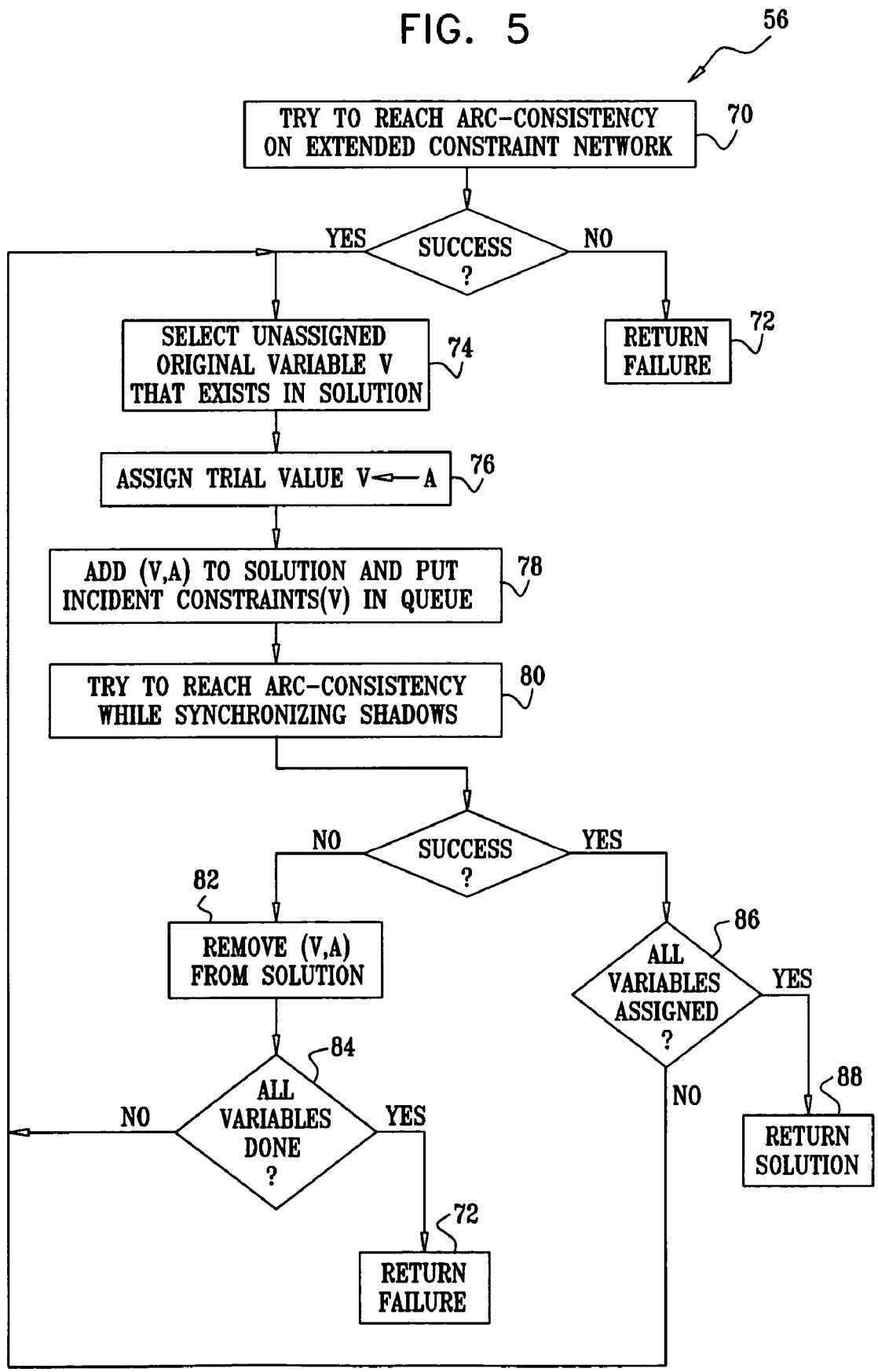
FIG. 5 is a flow chart that schematically illustrates a method for finding a solution to a constraint network by maintaining arc-consistency, in accordance with an embodiment of the present invention.

FIG. 5 is a flow chart that schematically shows details of solution step 56, in accordance with an embodiment of the present invention. This method of solution is shown in pseudocode form in Listing VIII in the Appendix. Initially, all the constraints in the extended constraint network (including the original constraints, existence constraints and union constraints) are placed in a constraint queue (Q). The CondCSP solver processes the constraints in the queue in order to reach arc-consistency over the extended network, at an initial arc-consistency step 70. Details of this step are shown in pseudocode form in Listing IX in the Appendix.

Briefly, at step 70, a constraint C is chosen from the queue and is then projected onto the variables in Vars(C). In this context, "projection" means that the constraint is applied to the initial domains of the variables, and the domains are narrowed, if necessary, to include only values that satisfy C. This sort of projection is the basic step in arc-consistency computation. The shadows are then synchronized in order to propagate domain changes among different shadows of the same variable. If a variable is modified in this process, then all the constraints that are incident on the variable are added to the queue, while the previously-projected constraint C is removed. This process continues until it reaches a fixed point, at which no further changes occur in the variable domains and the constraint queue is accordingly empty.

If the projection for some conditional constraint C fails, i.e., the domain of one or more of Vars(C) becomes null, then the corresponding existence variable $e_{ES(C)}$ is set to FALSE, and the process continues with the next constraint in the queue. If C is not conditional (i.e., ES(C) is empty), however, nullity of the domain of one or more of Vars(C) means that there is no solution to the constraint network. In this case, test generator 22 returns a failure report, at a failure step 72, indicating that no legal test cases can be derived for the present set of test requirements.

The procedure used for shadow synchronization at step 70 is shown in pseudocode form in Listing X in the Appendix. This procedure is based on a number of observations regarding different shadows of the same variable v:

1) If $ES_1 \subset ES_2$, then Domain(v[$ES_2$])$\subseteq$Domain(v[$ES_1$]).

2) If $ES_1 \subset ES_2$, but all the variables in $ES_1 \setminus ES_2$ are TRUE, then Domain(v [$ES_2$])$\subseteq$Domain(v [$ES_1$]).

In such cases, reductions in Domain(v[$ES_1$]) (including reductions in the domain of the original, non-shadow variable v) may be propagated by setting Domain(v[$ES_2$]) equal to its intersection with Domain (v[$ES_1$]). If the intersection is empty, it can be concluded that $ES_2$ is not satisfied on the current domain of v, and the corresponding existence variable may be set to FALSE. On the other hand, if Domain(v[$ES_2$])$\cap$Domain(v[$ES_1$])=$\bigcirc$, it can similarly be concluded that only one of v[$ES_1$] and v[$ES_2$] can exist in a solution of the CondCSP.

Assuming step 70 is successfully completed, the CondCSP solver selects one of the variables in Vars(P) (not one of the shadow variables) that has not yet been assigned a value, at a variable selection step 74. The selected variable should be one whose existence in the solution has not been ruled out by previous constraint projections, i.e., a variable v for which it has been established that $e_{ES(v)}$=FALSE should not be selected. Other than this limitation, the variable selected at step 74 may be chosen at random. To produce a minimal solution to the CondCSP, however, it is advantageous to choose v for which it is already known that $e_{ES(v)}$=TRUE.

A trial value a is assigned to v at an assignment step 76. Again, the value may be chosen at random, but for a minimal solution, when v is an existence variable, the value a=FALSE should be tried first. The assignment (v,a) is added to the current solution, and the constraints that are incident on v are added to the constraint queue, at an instantiation step 78. The constraints are then processed in an attempt to reach arc-consistency, at an arc-consistency iteration step 80. The procedure applied at step 80 is essentially the same as was applied at step 70, as shown in Listing IX.

If the CondCSP solver is unable to reach arc-consistency at step 80 with the assignment (v,a), it concludes that there is no solution with this assignment together with the other assignments that it has already made. In this case, (v,a) is removed from the current solution, at a backtracking step 82. The changes made to the domains of the variables in the course of this pass through step 80 are also undone. The CondCSP solver checks whether there are other possible assignments of v that have not yet been tried, and if so attempts to reach arc-consistency with these alternative assignments. As the solution procedure is recursive, the CondCSP solver may backtrack further and try new assignments of other variables that were assigned previously. As long as an arc-consistent solution is not found, the CondCSP solver continues this process of recursive evaluation until all variables are exhausted, at an exhaustion step 84. In this case, a failure report is returned at step 72.

On the other hand, if the CondCSP solver is successful in reaching arc-consistency at step 80, it keeps the assignment (v,a) and checks whether any active variables remain unassigned, at a completion checking step 86. If there are still one or more unassigned variables, the CondCSP solver returns to select a new variable to assign, at step 74, and repeats the process described above. When all variables have been successfully assigned and an arc-consistent solution is reached, the CondCSP solver returns the solution, at a conclusion step 88. As noted earlier, this solution is used in generating one of test cases 30.

Although the embodiments described above relate specifically to the field of test generation, the novel principles of CondCSP formulation and solution that are embodied in test generator 22 may similarly be applied in other areas in which CSP solving is used. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

APPENDIX

PSEUDOCODE LISTINGS

LISTING I

```
1:   procedure COMPUTEEXISTENCESETS( )
2:       // Compute constraints' existence sets
3:       // We assume that the variables' existence sets are already computed
4:       For all C ∈ Constraints(P) do
5:           // Compute C's existence set
6:           ES(C) ← ∅
7:           For all v ∈ Vars(C) do
8:               ES(C) ← ES(C) ∪ ES(v)
```

LISTING II

```
1:   procedure BUILDSHADOWS( )
2:       For all v ∈ Vars(P) do
3        Shadows(v) ← {v}
4:           For all C ∈ IncidentConstraints(v) do
5:               // Note that if ES(C) = ES(v), then v[ES(C)] coincides with v
6:               If v[ES(C)] doesn't exist (in Shadows(v)) then
7:                   Create new variable v[ES(C)]
8:                   Domain(v[ES(C)]) ← Domain(v)  // Initialize shadow's domain
9:                   Shadows(v) ← Shadows(v) ∪ {v[ES(C)]}
```

LISTING III

```
1:   procedure SUBSTITUTESHADOWS( )
2:       For all C ∈ Constraints(P) do
3:           NewConstraintVars ← ∅
4:           For all v ∈ Vars(C) do
5:               // replace v with v[ES(C)]
6:               NewConstraintVars ← NewConstraintVars ∪ {v[ES(C)]}
7:               // Update IncidentConstraints(v) and IncidentConstraints(v[ES(C)])
8:               IncidentConstraints(v) ← IncidentConstraints(v) \ {C}
9:               IncidentConstraints(v[ES(C)]) ← IncidentConstraints(v[ES(C)]) ∪ {C}
10:          Vars(C) ← NewConstraintVars
```

LISTING IV

```
1:   function COMPUTEEXISTANCECONSTRAINTS( )
2:       NewConstraints ← ∅
3:       NewVars ← ∅
4:       For all C ∈ Constraints(P) do
5:           If |ES(C)| ≥ 2 and variable e_{ES(C)} doesn't exist (in NewVars) then
6:               Create boolean variable e_{ES(C)}
7                NewVars ← NewVars ∪ {e_{ES(C)}}
8:               C' ← (∧_{e∈ES(C)} e = e_{ES(C)})  // Create constraint C'
9:               NewConstraints ← NewConstraints ∪ {C'}
10:              Update IncidentConstraints(υ) for υ ∈ Vars(C')
11:      For all v ∈ Vars(P) do
12:          For all v[ES],v[ES'] ∈ Shadows(v), ES ≠ ES' do
13:              If |ES∪ES'| ≥ 2 and variable e_{ES∪ES'} doesn't exist (in NewVars)
                     then
14:                  Create boolean variable e_{ES∪ES'}
15:                  NewVars ← NewVars ∪ {e_{ES∪ES'}}
16:                  C' ← (∧_{e∈ES∪ES'} e = e_{ES∪ES'})
17:                  NewConstraints ← NewConstraints ∪ {C'}
```

APPENDIX-continued

PSEUDOCODE LISTINGS

```
18:            Update IncidentConstraints(v) for v ∈ Vars(C')
19:        return NewConstraints
```

LISTING V

```
1:  function COMPUTEUNIONCONSTRAINTS( )
2:      UnionConstraints ← ∅
3:      NewConstraints ← ∅
4:      For all v ∈ Vars(P) do
5:          repeat
6:              UnionConstraints ← UnionConstraints ∪ NewConstraints
7:              NewConstraints ← ∅
8:              For all C ∈ ExistenceOrConstraints(P) do
9:                  // C = e_1 V e_2 V ... V e_k
10:                 If
                        exist shadows v_1, v_2, ..., v_k ∈ Shadows(v), s.t.
                        ∀i, 1 ≤ i ≤ k :  v_i = v[ES_i] for some ES_i and
                                         e_i ∈ ES_i, but ∀_{j,j ≠ i}, e_i ∉ ES_j
                    then
11:                     ES_0' ← ∩_{i=1}^{i=k} ES_i
12:                     // C may be conditional: ES(C) ≠ ∅
13:                     ES_0' ← ES_0' ∪ ES(C)
14:                     ∀i, 1 ≤ i ≤ k: ES_i' ← ES_0' ∪ {e_i}
15:                     For all 0 ≤ i ≤ k do
16:                         If shadow v[ES_i'] doesn't exist (in Shadows(v)) then
17:                             Create and initialize v[ES_i']
18:                             Shadows(v) ← Shadows(v) ∪ {v[ES_i']}
19:                     // Create UnionConstraint
20:                     C' ← UnionConstraint(v[ES_0'], v[ES_1'], ..., v[ES_k'])
21:                     If C' ∉ UnionConstraints then
22:                         New Constraints ← NewConstraints ∪ {C'}
23:         until NewConstraints ≠ ∅
24:     return UnionConstraints
```

LISTING VI

```
1:  function COMPUTEMAXIMALEQUIVALENTSET(ES)
2:      modified ← TRUE
3:      ES_max ← ES
4:      While modified do
5:          modified ← FALSE
6:          For all e ∈ ES_max do
7:              For all C ∈ ExistenceImplyConstraints(P), s.t. C = e → e' do
8:                  If ES(C) ⊆ ES_max and e' ∉ ES_max then
9:                      ES_max ← ES_max ∪ {e'}
10:                     modified ← TRUE
11:     return ES_max
```

This procedure can be accelerated by precomputing for each existence variable the set of variables that are implied by it.

LISTING VII

```
1:  function COMPUTEFIRSTMINIMALEQUIVALENTSET(ES)
2:      ES_min ← ES
3:      For all e ∈ ES in lexicographic order do
4:          If
                ComputeMaximalEquivalentSet(ES_min) =
                ComputeMaximalEquivalentSet(ES_min \ {e})
            then
5:              ES_min ← ES_min \ {e}
6:      return ES_min
```

LISTING VIII

```
1:  function SOLVEX(Sol)
2:      If called for the first time then
3:          // Q holds all the constraints at this point
4:          ReachArcConsistencyX( )
5:          If ReachArcConsistencyX returned FAILURE then
6:              // There is no solution
7:              return FAILURE
8:      // Sol - current partial assignment
9:      Select unassigned variable v from Vars(P) whose existence is not ruled
            out - e_{ES(v)} ≠ FALSE // Shadows are never instantiated
10:     // To get a minimal solution, always prefer variable whose existence
            is decided: e_{ES(v)} = TRUE
11:     OrigDomain ← Domain(v) // If Save v's original domain
12:     For all a ∈ OrigDomain do
```

APPENDIX-continued

PSEUDOCODE LISTINGS

```
13:         // To get a minimal solution, try FALSE value at first for the
                existence variables
14:         Domain(v) ← {a}
15:         Sol ← Sol ∪ {(v, a)}
16:         Q ← IncidentConstraints(v)
17:         ReachArcConsistencyX( )
18:         If ReachArcConsistencyX returned SUCCESS then
19:             SolveX(Sol)
20:             If SolveX returned SUCCESS then
21:                 return SUCCESS
22:         // There is no solution in this sub-space
23:         // Undo bad choice effect
24:         Restore variables' domains state prior to ReachArcConsistency invocation
25:         Sol ← Sol \ {(v,a)}
26:         return FAILURE
```

LISTING IX

```
1:  function REACHARCCONSISTENCYX( )
2:      While Q ≠ ∅ do
3:          Select constraint C ∈ Q, s.t. ES(C) is not falsified;
4:          Propagate constraint C;
5:          If propagation failed then
6:              // some of variables in Vars(C) has empty domain
7:              If ES(C) = ∅ then
8:                  return FAILURE
9:              else
10:                 e_{ES(c)} ← FALSE
11:                 ModifiedVars ← {e_{ES(C)}}
12:         else
13:             // Propagate changes in C's variables to their shadows
14:             Modified Vars ← {v|v ∈ Vars(C), Domain(v) modified by C propagation}.
15:             For all v ∈ Modified Vars do
16:                 // v is shadow of some variable w,
17:                 // s.t. v =w[ES] for some existence set ES
18:                 For all υ ∈ Shadows(w), s.t. υ = w[ES'],ES ≠ ES' do
19:                     // Propagate update from v to υ
20:                     SynchronizeShadows(w, ES, ES')
21:                     If e_{ES'} or e_{ES∪ES'} is modified then
22:                         Add the variable to ModifiedVars
23:                     else If Domain(υ) is modified then
24:                         Modified Vars ← Modified Vars ∪ {υ}
25:         // Update Q
26:         For all v ∈ Modified Vars do
27:             Q ← Q ∪ IncidentConstraints(υ)
28:         Q ← Q \ {C}
29:     return SUCCESS
```

LISTING X

```
1:  procedure SYNCHRONIZESHADOWS(v, ES, ES')
2:      // Propagate changes in v[ES] to v[ES']
3:      // Input parameters: v, ES, ES'
4:      // Output: could modify Domain(v[ES']), e_{ES'} or e_{ES∪ES'}
5:      If ES \ ES' = ∅ or all variables in ES \ ES' are TRUE then
6:          Domain(v[ES']) ← Domain(v[ES']) ∩ Domain(v[ES])
7:          If Domain(v[ES']) = ∅ then
8:              e_{ES'} ← FALSE
9:      else
10:         If Domain(v[ES']) ∩ Domain(v[ES]) = ∅ then
11:             e_{ES∪ES'} ← FALSE
```

The invention claimed is:

1. A computer-implemented method for modeling a target system, comprising:

defining a conditional constraint satisfaction problem (CondCSP) that characterizes the target system in terms of problem variables and constraints applicable to the problem variables, the constraints comprising conditional constraints, such that the variables associated with the conditional constraints each have a respective activity status;

defining existence variables to represent the respective activity status of the variables associated with each of the one or more conditional constraints; and finding a solution to the CondCSP by determining an assignment of the problem variables and the existence variables that satisfies the constraints, wherein determining the solution comprises computing parameters of a test case to be applied in evaluating a design of the target system, and comprising testing the design using the test case.

2. The method according to claim 1, wherein the target system comprises an electronic system comprising a processor, and wherein computing the parameters comprises generating one or more instructions for input to the processor.

3. The method according to claim 1, wherein defining the CondCSP comprises defining a composite CSP, comprising one or more sub-problems corresponding to the conditional constraints, and wherein each of the existence variables dominates one or more of the sub-problems.

4. The method according to claim 1, wherein the problem variables have respective domains, and wherein finding the solution comprises defining shadow variables corresponding to the problem variables and representing the domains of the problem variables subject to the respective activity status of the variables associated with the conditional constraints, and solving a CSP over the shadow variables.

5. The method according to claim 4, wherein defining the shadow variables comprises computing respective existence sets for the conditional constraints, each of the existence sets comprising one or more of the existence variables, and applying the existence sets to the problem variables to which the conditional.

6. The method according to claim 2, wherein defining the existence variables comprises at least one of computing an existence constraint over the existence variables and, if the CondCSP comprises an existence-or constraint, computing a union constraint over the existence variables, and wherein finding the solution comprises solving the CondCSP together with at least one of the existence constraint and the union constraint.

7. The method according to claim 1, wherein defining the existence variables comprises deriving an implication relation between at least two of the existence variables, and wherein finding the solution comprises computing respective existence sets for the conditional constraints, each of the existence sets comprising one or more of the existence variables, determining a minimal equivalent set for at least one of the existence sets responsively to the implication relation, and using the minimal equivalent set in determining the assignment.

8. A computer-implemented method for modeling a target system, comprising:
defining a conditional constraint satisfaction problem (CondCSP) that characterizes the target system in terms of problem variables, which have respective domains, and constraints applicable to the problem variables, the constraints comprising one or more conditional constraints, such that the variables associated with the conditional constraints each have a respective activity status;
defining shadow variables corresponding to the problem variables and representing the domains of the problem variables subject to the respective activity status of the variables associated with the conditional constraints; and
solving a CSP over the shadow variables in order to find an assignment of the problem variables that satisfies the constraints,
wherein solving the CondCSP comprises making an assignment of a respective value to at least one of the problem variables, and applying the constraints to the shadow variables while maintaining arc consistency subject to the assignment so as to reduce the domains of the shadow variables.

9. The method according to claim 8, wherein the shadow variables comprise at least first and second shadow variables, both of which correspond to one of the problem variables and have respective first and second domains, and wherein applying the constraints comprises reducing the first domain, and then synchronizing the first and second shadow variables so as to reduce the second domain.

10. Apparatus for modeling a target system, comprising:
an input interface, which is coupled to receive a definition of a conditional constraint satisfaction problem (CondCSP) that characterizes the target system in terms of problem variables and constraints applicable to the problem variables, the constraints comprising conditional constraints, such that the variables associated with the conditional constraints each have a respective activity status; and
a CondCSP processor, which is arranged to apply existence variables to represent the respective activity status of the variables associated with each of the one or more conditional constraints, and to find a solution to the CondCSP by determining an assignment of the problem variables and the existence variables that satisfies the constraints,
wherein the problem variables have respective domains, and wherein the CondCSP processor is arranged to define shadow variables corresponding to the problem variables and representing the domains of the problem variables subject to the respective activity status of the variables associated with the conditional constraints, and to solve a CSP over the shadow variables.

11. The apparatus according to claim 10, wherein the CondCSP processor is arranged to compute respective existence sets for the conditional constraints, each of the existence sets comprising one or more of the existence variables, and to apply the existence sets to the problem variables to which the conditional constraints apply in order to find the shadow variables.

12. The apparatus according to claim 10, wherein the CondCSP processor is arranged to solve the CondCSP by making an assignment of a respective value to at least one of the problem variables, and applying the constraints to the shadow variables while maintaining arc consistency subject to the assignment so as to reduce the domains of the shadow variables.

13. The apparatus according to claim 12, wherein the shadow variables comprise at least first and second shadow variables, both of which correspond to one of the problem variables and have respective first and second domains, and wherein the CondCSP processor is arranged to reduce the first domain, and then to synchronize the first and second shadow variables so as to reduce the second domain.

14. A computer software product for modeling a target system, the product comprising a computer-readable medium in which program instructions are stored, which instructions, when read by a computer, cause the computer to receive a definition of a conditional constraint satisfaction problem (CondCSP) that characterizes the target system in terms of problem variables and constraints applicable to the problem variables, the constraints comprising conditional constraints, such that the variables associated with the conditional constraints each have a respective activity status, and to apply existence variables to represent the respective activity status of the variables associated with each of the one or more conditional constraints, and to find a solution to the CondCSP by determining an assignment of the problem variables and the existence variables that satisfies the constraints,
wherein the problem variables have respective domains, and wherein the instructions cause the computer to define shadow variables corresponding to the problem variables and representing the domains of the problem variables subject to the respective activity status of the variables associated with the conditional constraints, and to solve a CSP over the shadow variables.

15. The product according to claim 14, wherein the instructions cause the computer to compute respective existence sets for the conditional constraints, each of the existence sets comprising one or more of the existence variables, and to apply the existence sets to the problem variables to which the conditional constraints apply in order to find the shadow variables.

16. The product according to claim 14, wherein the instructions cause the computer to solve the CondCSP by making an assignment of a respective value to at least one of the problem variables, and applying the constraints to the shadow variables while maintaining arc consistency subject to the assignment so as to reduce the domains of the shadow variables.

* * * * *